United States Patent [19]

Kashiwagi

[11] Patent Number: 5,412,485
[45] Date of Patent: May 2, 1995

[54] IMAGE PROCESSING APPARATUS CAPABLE OF PROCESSING IMAGES ON BOTH SIDE ORIGINAL

[75] Inventor: Kazuo Kashiwagi, Tokyo, Japan

[73] Assignee: Canon Kabushiki Kaisha, Tokyo, Japan

[21] Appl. No.: 259,126

[22] Filed: Jun. 13, 1994

Related U.S. Application Data

[63] Continuation of Ser. No. 857,952, Mar. 26, 1992, abandoned.

[30] Foreign Application Priority Data

Apr. 3, 1991 [JP] Japan .................. 3-098155

[51] Int. Cl.⁶ ............................................. H04N 1/00
[52] U.S. Cl. .................... 358/441; 358/448; 358/496; 358/498; 358/471; 358/444
[58] Field of Search ............... 358/448, 496, 498, 401, 358/400, 404, 444, 471, 474, 437, 441, 296, 501, 500, 524; 355/233

[56] References Cited

U.S. PATENT DOCUMENTS

| | | | |
|---|---|---|---|
| 4,475,128 | 10/1984 | Koumura | 358/496 |
| 4,743,974 | 5/1988 | Lockwood | 358/496 |
| 4,802,229 | 1/1989 | Yamada | 358/441 |
| 4,839,740 | 6/1989 | Yoshida | 358/498 |
| 4,905,098 | 2/1990 | Sakata | 358/496 |
| 4,908,719 | 3/1990 | Nonoyama | 358/496 |
| 4,910,612 | 3/1990 | Yamazaki | 358/496 |
| 4,949,189 | 8/1990 | Ohmori | 358/496 |
| 5,038,222 | 8/1991 | Saito | 358/401 |
| 5,046,166 | 9/1991 | Takayanagi | 358/444 |
| 5,055,935 | 10/1991 | Ohno | 358/444 |
| 5,105,284 | 4/1992 | Sakata et al. | 358/404 |
| 5,132,808 | 7/1992 | Higuchi et al. | 358/444 |
| 5,136,665 | 8/1992 | Inoue | 358/496 |
| 5,280,545 | 1/1994 | Masuda | 382/41 |

Primary Examiner—Edward L. Coles, Sr.
Assistant Examiner—Fan Lee
Attorney, Agent, or Firm—Fitzpatrick, Cella, Harper & Scinto

[57] ABSTRACT

An image processing apparatus includes a reading section for reading images on one side and the other side of an original, a mode selecting section for selecting one of one side mode and two side mode, the one side mode being adapted to process an image on only one side of an original, and the two side mode being adapted to process images on both sides of an original, a discriminating section for discriminating whether the original from which the images are read by the reading section is a one side original having an image on only one side thereof or a both side original having images on both sides thereof, and an alarm section for generating an alarm when the one side mode is selected by the mode selecting section and the discriminating section discriminates that the original from which the images are read by the reading section is a both side original.

21 Claims, 5 Drawing Sheets

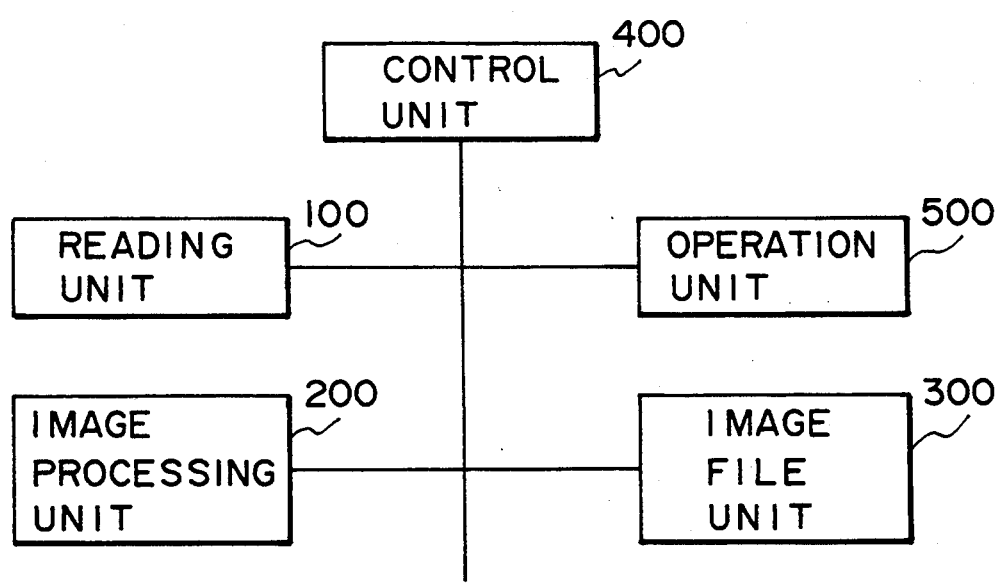
F I G. 1

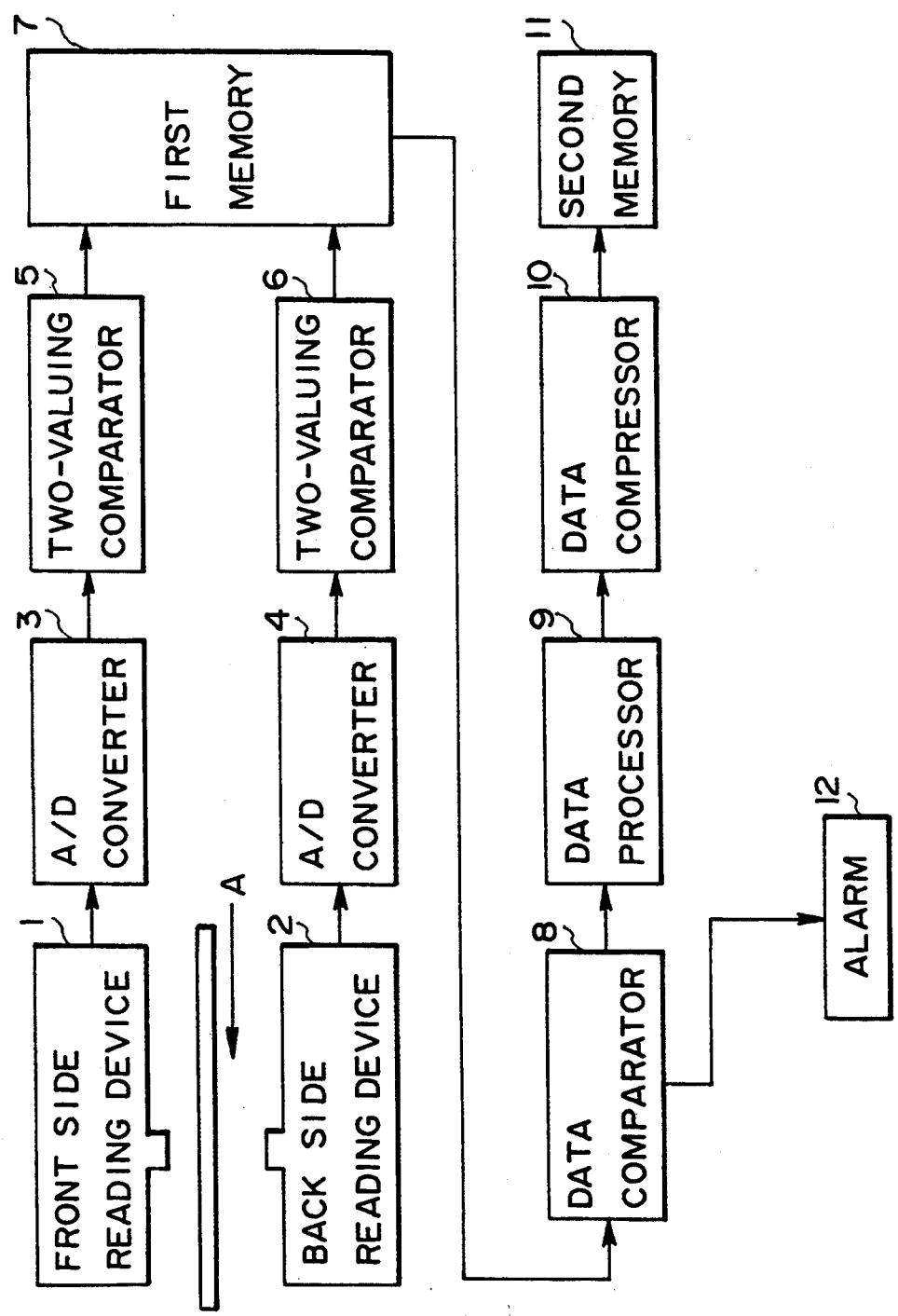
F I G. 2

IMAGE PROCESSING APPARATUS CAPABLE OF PROCESSING IMAGES ON BOTH SIDE ORIGINAL

This application is a continuation of application Ser. No. 07/857,952 filed Mar. 26, 1992, now abandoned.

BACKGROUND OF THE INVENTION

1. Field of the Invention

The present invention relates to an image processing apparatus for reading images on the front and back sides of an original and processing the read images.

2. Related Background Art

Image data processing apparatuses have been proposed in, e.g., U.S. Pat. No. 5,038,222 and U.S. Ser. No. 797,163 filed on Nov. 26, 1991, which include a scanner capable of reading images on the front and back sides of an original, and has not only a one side mode for reading an image on only one side of an original, but also a both side mode for reading images on both sides of an original.

In these image data processing apparatuses, when the one side reading mode is set in accordance with mode selection upon a key operation by an operator, one side images on original pages are sequentially read and stored, for example. When the both side reading mode is set, images on the front and back sides of original pages are sequentially read and stored, for example.

In such an image data processing apparatus having the two modes, i.e., the both side reading mode and the one side reading mode, if the one side reading mode is erroneously designated instead of processing both side originals, images on the back sides are not read and hence are omitted from stored data.

SUMMARY OF THE INVENTION

It is an object of the present invention to provide an image processing apparatus which can eliminate the above-described drawback.

It is another object of the present invention to provide an image processing apparatus which can identify a both side original, when the one side reading mode is set, and can warn an operator against an erroneous operation.

It is still another object of the present invention to provide an image processing apparatus which reads images on both sides of a both side original even in the one side reading mode, and the image on one side can be easily deleted as needed, thereby preventing omission of image data due to erroneous mode setting, and allowing one side original processing at the same time.

It is still another object of the present invention to provide an image processing apparatus which can improve the operability by preventing an erroneous operation that only an image on one side of a both side original is stored due to a mode setting error, when images on the both side original are to be stored in a storage medium.

The above and other objects, features, and advantages of the present invention will be apparent from the following detailed description in conjunction with the accompanying drawings and the appended claims.

BRIEF DESCRIPTION OF THE DRAWINGS

FIG. 1 is a block diagram showing an embodiment of an image data processing apparatus to which the present invention can be applied;

FIG. 2 is a block diagram showing the arrangement of a processing circuit for performing a series of operations, from an image reading operation to a storing operation, in the embodiment shown in FIG. 1;

DESCRIPTION OF THE PREFERRED EMBODIMENT

Figure 3:
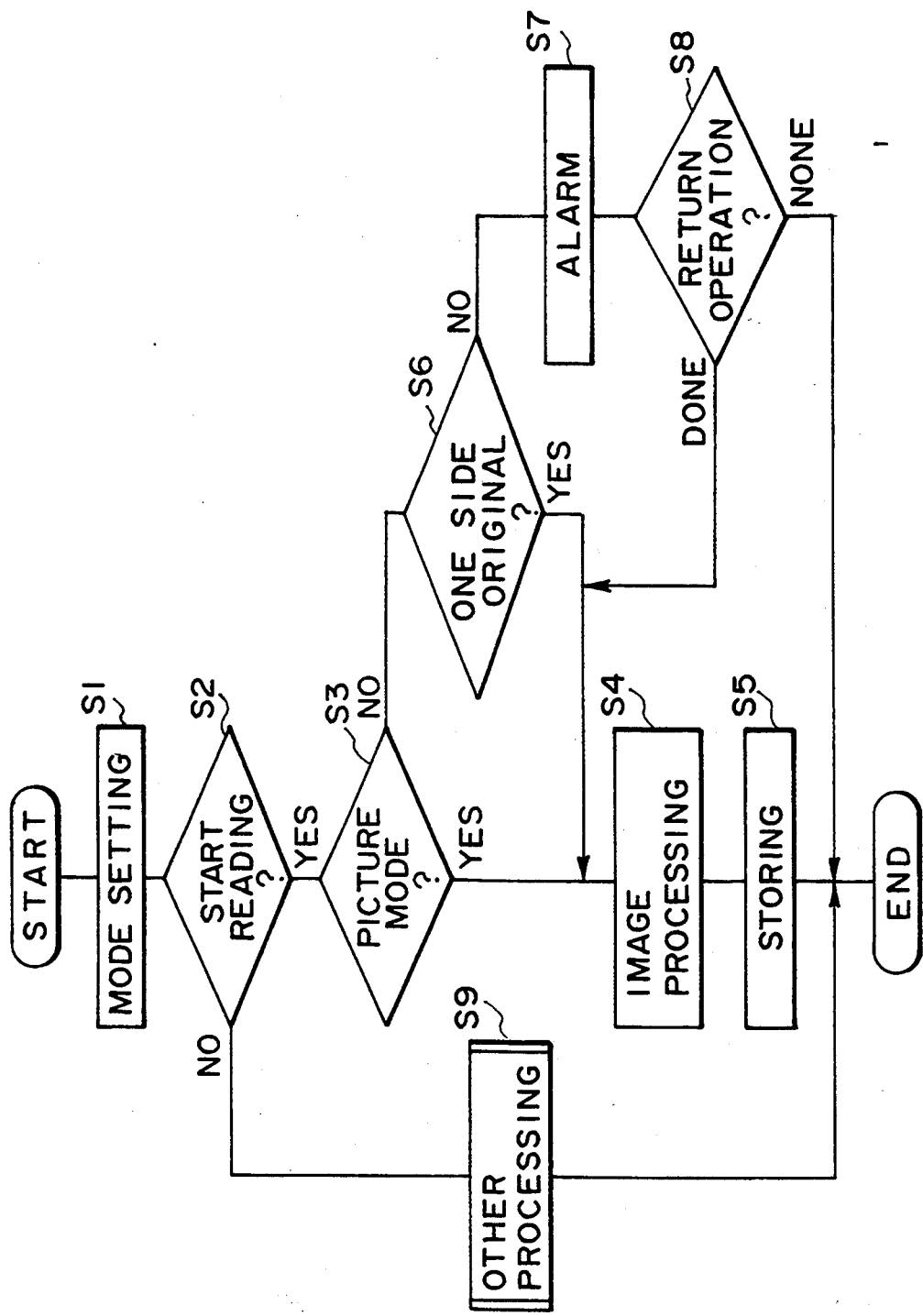
FIG. 3 is a flow chart showing an outline of operations, from an image reading operation to a storing operation, in the embodiment shown in FIG. 1.

FIG. 1 is a block diagram showing an embodiment of an image data processing apparatus to which the present invention can be applied.

This image data processing apparatus includes a reading unit 100 for reading images on originals, an image processing unit 200 for performing image compression processing and the like with respect to image data output from the reading unit 100, an image file unit 300 for storing image data, output from the image processing unit 200, in a storage medium such as an optomagnetic disk, an image output unit 600 for outputting image data, stored in the image file unit 300, through a CRT or a printer, a control unit 400 for controlling the overall processing in the respective units, and an operation unit 500 through which an operator designates various types of modes and execution of processing.

FIG. 2 is a block diagram showing the arrangement of a processing circuit for performing a series of operations, from an image reading operation to a storing operation, in the apparatus of this embodiment.

Assume that an original O is fed in a direction indicated by an arrow A.

Each of reading devices 1 and 2 has a line image sensor constituted by a plurality of light-receiving elements arranged in a direction perpendicular to the feeding direction of the original O, and serves to photoelectrically read images on the front and back sides of the original O.

A/D converters 3 and 4 serve to convert analog image signals output from the reading devices 1 and 2 into digital image signals, each having a predetermined number of bits, in units of pixels.

Each of two-valuing comparators 5 and 6 outputs a signal of "1", when a digital image signal output from a corresponding one of the A/D converters 3 and 4 is larger than a predetermined value, and outputs a signal of "0", when the digital image signal is smaller than the predetermined value, thereby converting the image signal into a binary value.

A first memory 7 is a buffer memory for temporarily storing outputs from the two-valuing comparators 5 and 6.

A data comparator 8 reads out image data stored in the memory 7 to check the presence/absence of an image on each side of an original.

A data processor 9 processes image data in accordance with the comparison result of the data comparator 8.

A data compressor 10 serves to compress processed data.

A second memory 11 constitutes the image file unit 300 for finally storing compressed image data, and uses a known magnetic disk, magnetic tape, or optical disk as a medium.

An alarm 12 has an LCD (not shown) and serves to perform a predetermined alarm display operation to warn a user.

FIG. 3 is a flow chart showing an outline of operations, from an image reading operation to a storing operation, in such an image data processing apparatus.

Mode setting and the like are performed through the operation unit 500 prior to an image reading operation (step S1). This setting operation is performed by using various types of keys arranged on the operation unit 500. More specifically, in this embodiment, a both side-/one side selection key (not shown) is operated to select the both side mode for processing both side originals or the one side mode for processing one side originals.

When a start operation is performed through the operation unit 500, image data are read from originals, set beforehand on an original table, by the reading unit 100 (step S2). If the both side mode is set by the above-mentioned mode selection in step S1, front side image data and back side image data of each original are transferred to the image processing unit 200 in this order, and predetermined image processing is performed (step S4). Thereafter, the image data are stored in the storage medium of the image file unit 300 (step S5).

Note that even if the both side mode is determined in step S3, an original having an image on only one side may be supplied. In this embodiment, data on a blank side is automatically deleted regardless of whether the both side or one side mode is set, as will be described later.

If the one side mode is determined in step S3, and one side originals are supplied (step S6), image data of the respective original pages are sequentially transferred to the image processing unit 200, and predetermined image processing is performed (step S4). Thereafter, the image data are stored in the image file unit 300 (step S5).

If the one side mode is selected in step S3, and both side originals are supplied (step S6), alarm processing is performed, and a warning is displayed on the operation unit 500, thus indicating a mode selection error (step S7). With this warning, the operator performs some kind of return operation (step S8). In accordance with this operation, the image data are transferred to the image processing unit 200, and predetermined image processing is performed (step S4). Subsequently, the image data are stored in the image file unit 300 (step S5).

If a request other than an image read request is designated in step S2, e.g., an output request with respect to prestored image data, processing other than a reading operation is performed in accordance with the request (step S9).

Figure 4:
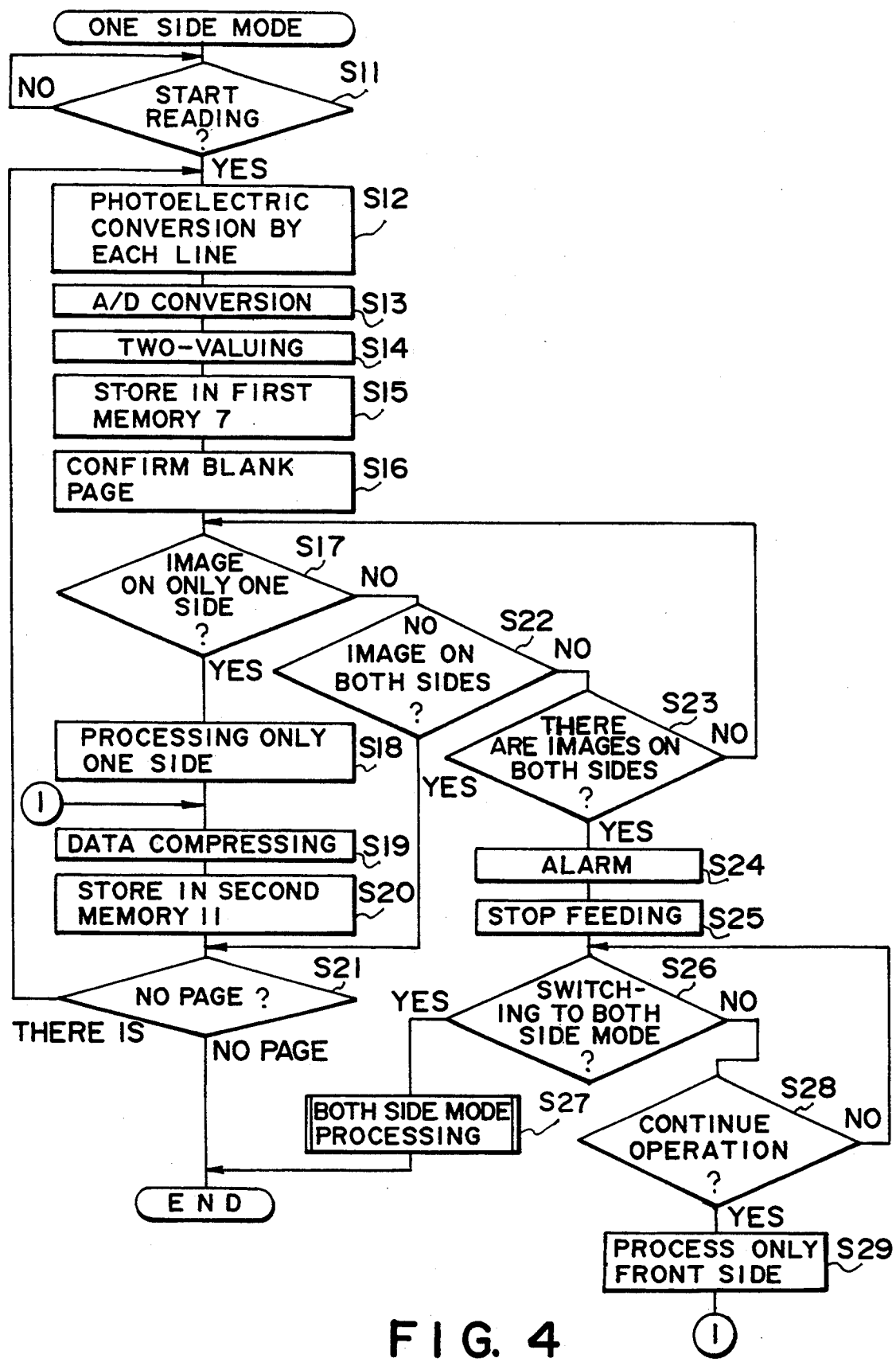
FIG. 4 is a flow chart showing a detailed processing sequence in the one side mode, from an image reading operation to a storing operation, in the embodiment shown in FIG. 1.

FIG. 4 is a flow chart showing a detailed processing sequence in the one side mode, from an image reading operation to a storing operation.

When the reading mode is set to the one side mode, and an image reading operation is started (step S11), the reading devices 1 and 2, arranged on the front and back sides of the original travel path, respectively convert images on the front and back sides of the original O into analog electrical signals in units of lines, and output the signals to the A/D converters 3 and 4 (step S12).

The A/D converters 3 and 4 convert the front and back side analog image data into digital image data and output them (step S13). The two-valuing comparators 5 and 6 then compare the digital image data with a predetermined value, thus converting the data into binary image data (step S14).

The binary image data are temporarily stored in the first memory 7 (step S15).

Subsequently, the data comparator 8 reads out the binary data stored in the memory 7 to check whether a predetermined amount or more of black-level image data is present on either the front side or the back side, i.e., either side of each original is a blank page (step S16).

Note that since the background of an original may be colored, the presence/absence of an image may be checked on the basis of the presence/absence of changes in level of image data. For example, the presence of a blank page may be determined if a predetermined amount of image data is kept at "0" or "1" level.

If there is an image on only one side (step S17), this one side image data is transferred to the data processor 9 to be output while image data of the other side is deleted (step S18). Data compressing of the output data is performed by the data compressor 10 (step S19). Finally, the data is stored in the second memory 11 (step S20). Subsequently, feeding of the next original is performed (step S21).

If it is determined that images are formed on neither sides (step S22), the resulting image data is transferred to the data processor 9, and feeding of the next original is performed (step S21).

If it is determined that there are images on both sides (step S23), an alarm is generated by the alarm 12 (step S24), and feeding of the next original is temporarily stopped (step S25).

If the user sees this alarm display and decides to store the images on both sides of the original, he/she operates the both side/one side selection key to set the both side mode (step S26). With this operation, the subsequent processing is performed in the both side mode (step S27).

If the user decides to store the image on only one side of the original, he/she pushes an operation continue key (not shown) of the operation unit 500 (step S28) to continue the operation in the one side mode, so that only the front side image data of the both side image data is stored (step S29).

Figure 5:
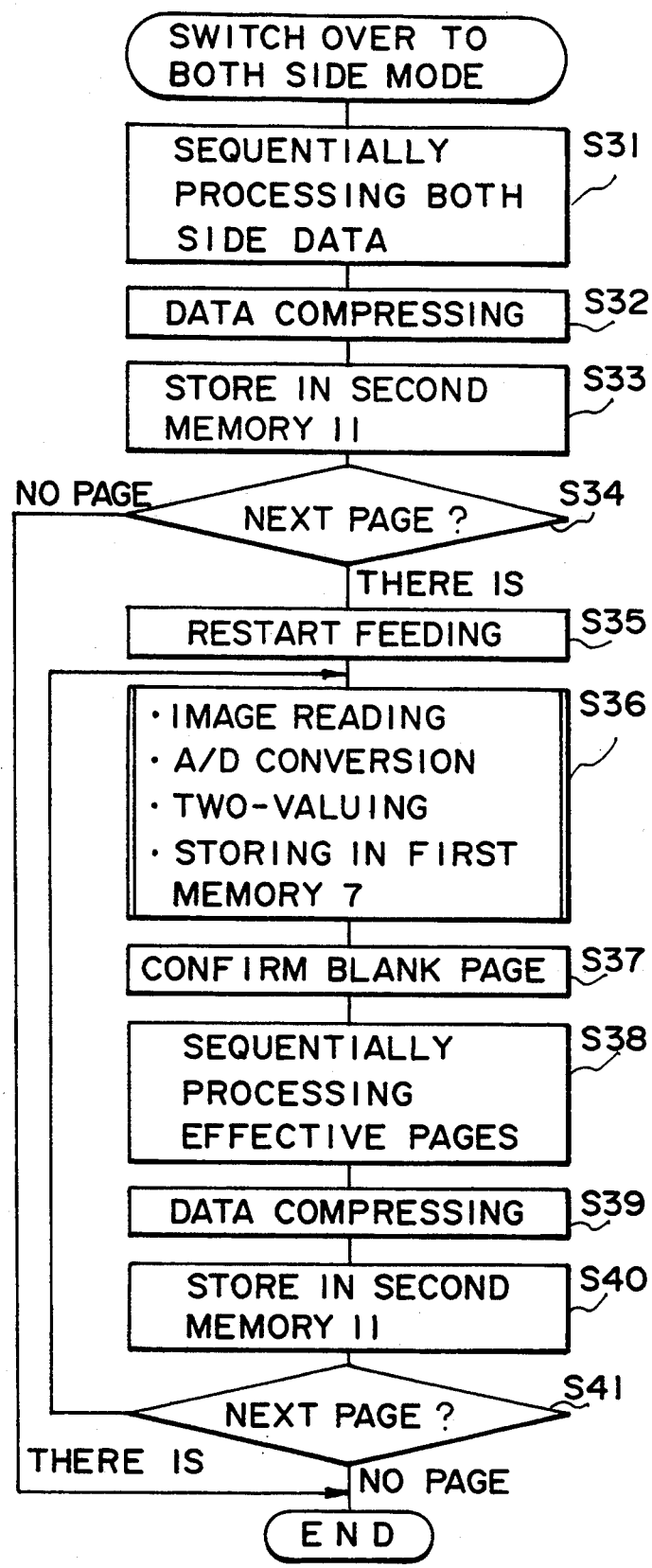
FIG. 5 is a flow chart showing a processing sequence after the one side mode is switched to the both side mode in the embodiment shown in FIG. 1.

FIG. 5 is a flow chart showing a processing sequence after a switching operation to the both side mode is performed in step S26, and the one side mode is switched to the both side mode in step S27.

By referring to the first memory 7, front and back side image data of both side image data stored therein are processed in this order (step S31). After data compressing of the image data is performed (step S32), the resulting data are stored in the second memory 11 (step S33).

If the next page is present (step S34) after this operation, the original feeding operation is restarted (step S35), and normal both side processing is performed (steps S36 to S41). Note that the original feeding operation may be restarted (step S35) parallel to the processing of the data left in the first memory (steps S31 to S33).

In the above-described embodiment, when a both side original is fed in the one side mode, an alarm is generated to stop the feeding operation. However, instead of this operation, the feeding operation may be continued to store the image data of the both side original, and an alarm is generated after all the original image data are stored, so that the back side data are collectively deleted by the user as needed, or necessary back side data are designated to delete other back side data, or unnecessary back side data are designated to be deleted.

Furthermore, in the above embodiment, an alarm display is performed by the LCD. However, instead of this operation, an alarm sound may be produced.

The present invention is not limited to the above-described embodiment. Various changes and modifications can be made within the scope of the invention defined by the appended claims.

What is claimed is:

1. An image processing apparatus comprising:
   reading means for reading images on one side and the other side of an original;
   mode selecting means for selecting one of a one side processing mode and a two sided processing mode, the one side processing mode being adapted to process an image on only one side of an original, and the two side processing mode being adapted to process images on both sides of an original;
   discriminating means for discriminating whether the original from which the images are read by said reading means is a one side original having an image on only one side thereof or a both side original having images on both sides thereof; and
   alarm means for generating an alarm when the one side processing mode is selected by said mode selecting means and said discriminating means discriminates that the original from which the images are read by said reading means is a both side original.

2. An apparatus according to claim 1, further comprising control means for stopping an operation of said reading means when the one side mode is set and said discriminating means discriminates that the original is a both side original.

3. An apparatus according to claim 1, wherein said reading means comprises a first reading element for reading an image on one side of an original, and a second reading element for reading an image on the other side of the original.

4. An apparatus according to claim 3, wherein said first and second reading elements are positioned to oppose each other through an original.

5. An apparatus according to claim 1, wherein said discriminating means discriminates whether the original is a one side or two side original on the basis of image data output from said reading means.

6. An apparatus according to claim 1, further comprising storage means for storing front and back side image data, output from said reading means, in a storage medium.

7. An image processing apparatus comprising:
   input means for inputting images on one side and the other side of an original;
   selecting means for selecting one of a one side processing mode and a two side processing mode, the one side processing mode being adapted to process an image on only one side of an original, and the two side processing [second]mode being adapted to process images on both sides of an original;
   processing means for processing the images, input from said input means, in accordance with the mode selected by said selecting means;
   discriminating means for discriminating whether the images input from said input means are images on an original of a first type or images on an original of a second type; and
   control means for, when the one side processing mode is selected by said selecting means, maintaining the one side processing mode, if the discrimination result of said discriminating means indicates an original of the first type, and switching one side processing mode to the two side processing mode if the discrimination result indicates an original of the second type.

8. An apparatus according to claim 7, wherein the original of the first type is a one side original having an image on only one side thereof, and the original of the second type is a both side original having images on both sides thereof.

9. An apparatus according to claim 7, further comprising alarm means for generating an alarm when the discrimination result obtained by said discriminating means indicates an original of the second type.

10. An apparatus according to claim 7, wherein said selecting means is manually operated to perform selection by an operator.

11. An apparatus according to claim 7, wherein said discriminating means discriminates a type of an original on the basis of an image signal input from said input means.

12. An apparatus according to claim 7, further comprising storage means for storing an image processed by said processing means in a storage medium.

13. An image processing apparatus comprising:
   input means for inputting images on one side and the other side of an original;
   selecting means for selecting one of a one side processing mode and a two side processing mode, the one side processing mode being adapted to process and image on only one side of an original, and the two side processing mode being adapted to process images on both sides of an original;
   processing means for processing the images, input from said input means, in accordance with the mode selected by said selecting means;
   discriminating means for discriminating whether the images input from said input means are images on an original of a first type or images on an original of a second type: and
   control means for, when the one side processing mode is selected by said selecting means, maintaining the one side processing mode, if the discrimination result of said discriminating means indicates an original of the first type, and controlling said selecting means to select either maintaining the one side processing mode or switching the one side processing mode to the two side processing model in accordance with a command from an operator, if the discrimination result indicates an original of the second type.

14. An apparatus according to claim 13, wherein the original of the first type is a one side original having an image on only one side thereof, and the original of the second type is a both side original having images on both sides thereof.

15. An apparatus according to claim 13, further comprising alarm means for generating an alarm when the discrimination result obtained by said discriminating means indicates an original of the second type.

16. An apparatus according to claim 13, wherein said discriminating means discriminates a type of an original on the basis of an image signal input from said input means.

17. An apparatus according to claim 13, further comprising storage means for storing an image processed by said processing means in a storage medium.

18. An image processing apparatus comprising:
   input means for inputting images on one side and the other side of an original
   mode selecting means for selecting one of one side storing mode and two side storing mode, the one side storing mode being adapted to store an image on only one side of an original in a storage medium, and the two side storing mode being adapted to store images on both sides of an original in said storage medium;
   discriminating means for discriminating whether the images input from said input means are images on an original of a first type or images on an original of a second type; and
   control means for, when the one side storing mode is selected by said mode selecting means, storing the image on only one side of the original in said storage medium, if the discrimination result of said discriminating means indicates an original of the first type, and for controlling whether the image on one side of the original stored in said storage medium is deleted, in accordance with a command from an operator after the images on both sides of the original are stored in said storage medium, if the discrimination results indicates an original of the second type.

19. An apparatus according to claim 18, wherein the original of the first type is a one side original having an image on only one side thereof, and the original of the second type is a both side original having images on both sides thereof.

20. An apparatus according to claim 18, further comprising alarm means for generating an alarm when the discrimination result obtained by said discriminating means indicates an original of the second type.

21. An apparatus according to claim 18, wherein said discriminating means discriminates a type of an original on the basis of an image signal input from said input means.

* * * * *

UNITED STATES PATENT AND TRADEMARK OFFICE
CERTIFICATE OF CORRECTION

PATENT NO. : 5,412,485
DATED : May 2, 1995
INVENTOR(S) : KAZUO KASHIWAGI

It is certified that error appears in the above-identified patent and that said Letters Patent is hereby corrected as shown below:

COLUMN 6

Line 36, "and" (first occurrence) should read --an--.
    Line 54, "model" should read --mode,--.

COLUMN 7

Line 8, "original" should read --original;--.

COLUMN 8

Line 7, "results" should read --result--.

Signed and Sealed this

Fifth Day of September, 1995

Attest:

BRUCE LEHMAN

Attesting Officer    Commissioner of Patents and Trademarks